United States Patent [19]
Blair

[11] 3,938,384
[45] Feb. 17, 1976

[54] MASS FLOW METER WITH REDUCED ATTITUDE SENSITIVITY

[75] Inventor: Richard F. Blair, Palos Verdes Peninsula, Calif.

[73] Assignee: Tylan Corporation, Torrance, Calif.

[22] Filed: July 23, 1973

[21] Appl. No.: 381,455

Related U.S. Application Data

[63] Continuation-in-part of Ser. No. 297,549, Oct. 13, 1972, abandoned.

[52] U.S. Cl. .................................................. 73/204
[51] Int. Cl.² ......................... G01F 1/68; G01P 5/10
[58] Field of Search ....................................... 73/204

[56] References Cited
UNITED STATES PATENTS

| | | | |
|---|---|---|---|
| 2,813,237 | 11/1957 | Fluegel et al. | 73/204 |
| 3,246,523 | 4/1966 | Richard | 73/204 |
| 3,336,804 | 8/1967 | Poppendiek et al. | 73/204 |
| 3,372,590 | 3/1968 | Sterling | 73/204 |
| 3,433,068 | 3/1969 | Werner et al. | 73/204 |
| 3,614,967 | 10/1971 | Royston | 138/149 |
| 3,677,085 | 7/1972 | Hayakawa | 73/204 |
| 3,802,264 | 4/1974 | Poppendiek et al. | 73/204 |

FOREIGN PATENTS OR APPLICATIONS

| | | | |
|---|---|---|---|
| 876,484 | 5/1953 | Germany | 73/204 |
| 673,143 | 6/1952 | United Kingdom | 73/204 |

OTHER PUBLICATIONS

Bowes, "Variable Resistance Sensors Work Better With Constant Current Excitation," in Instrument Technology, 1966.

*Primary Examiner*—Herbert Goldstein
*Attorney, Agent, or Firm*—Nilsson, Robbins, Bissell, Dalgarn & Berliner

[57] ABSTRACT

A mass flow meter for measuring the flow rate of a fluid in a sensing tube over a wide ambient temperature range and with low sensitivity to attitude change. A pair of sensor temperature sensitive resistive wire coils are wound around the outer surface of the tube along the flow path of the fluid and are encased in open cell foam material. The sensor elements are heated and the rate of mass flow of the fluid is directly proportional to the temperature differential between the sensor elements. The sensor elements can be connected to a bridge circuit for detecting the temperature differential of the sensor elements. Tilting the sensor from the initial balance position results in a change in meter reading of less than 0.5%.

5 Claims, 3 Drawing Figures

3,938,384

MASS FLOW METER WITH REDUCED ATTITUDE SENSITIVITY

CROSS-REFERENCE TO RELATED APPLICATION

This application is a continuation-in-part of Application Ser. No. 297,549 filed Oct. 13, 1972, entitled "MASS FLOW METER", now abandoned.

FIELD OF THE INVENTION

The field of art to which the invention pertains includes the field of fluid flow sensing, particularly with respect to method an apparatus for measuring the mass flow of a fluid.

BACKGROUND AND SUMMARY OF THE INVENTION

In conventional mass flow meters, heat is applied to a sensing tube conducting the fluid to be measured or is directly applied to a fluid and the temperature of the fluid is measured before and after the addition. When the upstream temperature is equal to the unheated stream temperature, mass flow can be measured as inversely proportional to the temperature difference for a constant heat addition. A conventional bridge circuit can be used to obtain an electrical signal versus flow function. In another arrangement, heat is applied to a sensing tube and the temperature of the tube measured before and after the heat addition. The upstream temperature of the fluid is influenced by the heating of the tube and is nearly equal to the heater temperature at zero flow. The mass flow of the fluid is proportional to the temperature differential for a constant heat addition. In a third arrangement, heat is applied to a very small wire, probe or thermistor in the fluid stream and the cooling effect of the fluid stream is measured. Cooling of the element is a function of the mass flow. In still another arrangement, heat is applied uniformly to a tube by resistance heating and the cooling effect of the fluid measured with thermocouples to determine mass flow. In yet another arrangement, described in detail in my earlier application, referred to above, a pair of temperature sensitive resistance wire coils are wound around the outer surface of a sensing tube through which the fluid flows. The coils are heated and the rate of mass flow of the fluid, which is directly proportional to the temperature differential of the coils, is measured by a bridge circuit.

Known prior art includes U.S. Pat. Nos. 946,886; 1,043,983; 1,193,488; 1,218,717; 1,222,494; 1,254,374; 1,261,086; 1,601,513; 2,594,618; 2,832,018; 2,953,022; 2,972,885; 2,994,222; 3,056,295; 3,181,357; 3,229,522; 3,246,523; 3,251,225; 3,433,068; 3,435,676; 3,500,686; and 3,650,151; German patent 876,484 and British patent 673,143. A publication of interest is "Variable Resistance Sensors Work Better With Constant Current Excitation", by C. A. Bowes, Instrumentation Technology (1966).

The last mentioned arrangement, i.e., using a pair of resistance coils, provides increased sensor efficiency due to reduced loss of heat in the sensor elements. The spacing and size of the sensor elements permits fast response to changes in flow. The sensor elements sense temperatures produced by their own dissipation, thereby keeping thermal lag to an absolute minimum.

While such a dual coil arrangement enables the measurement of mass flow of a fluid over a wide temperature range, satisfactory operation can be obtained substantially only at the attitude at which the sensing tube is oriented when the bridge circuit is balanced. With the sensing tube located even in a still air environment, convective air currents around the coils carry the generated heat up and away. As the sensing tube is tilted so that one coil is higher than the other, heat generated from the lower coil is carried to the higher coil and raises its resistance which, therefore, unbalances the bridge circuit. The bridge circuit is balanced at no flow and with the sensing tube horizontal (or with both coils at the same level if the tube is bent). Therefore, the bridge circuit output is influenced by the position or attitude of the sensing tube and is not simply a function of the flow rate of the fluid.

The present invention provides reduced flow meter sensitivity to changes in attitude and is accomplished by encasing the sensing tube coils in an open cell foam material. The result is a minimization of natural convection around the sensor coils and a reduction in attitude sensitivity from greater than 50%, without the encasement, to less than 0.5%.

The advantages of this invention, both as to its construction and mode of operation, will be readily appreciated as the same becomes better understood by reference to the following detailed description when considered in connection with the accompanying drawings in which like reference numerals designate like parts throughout the figures.

DETAILED DESCRIPTION

Figure 1:
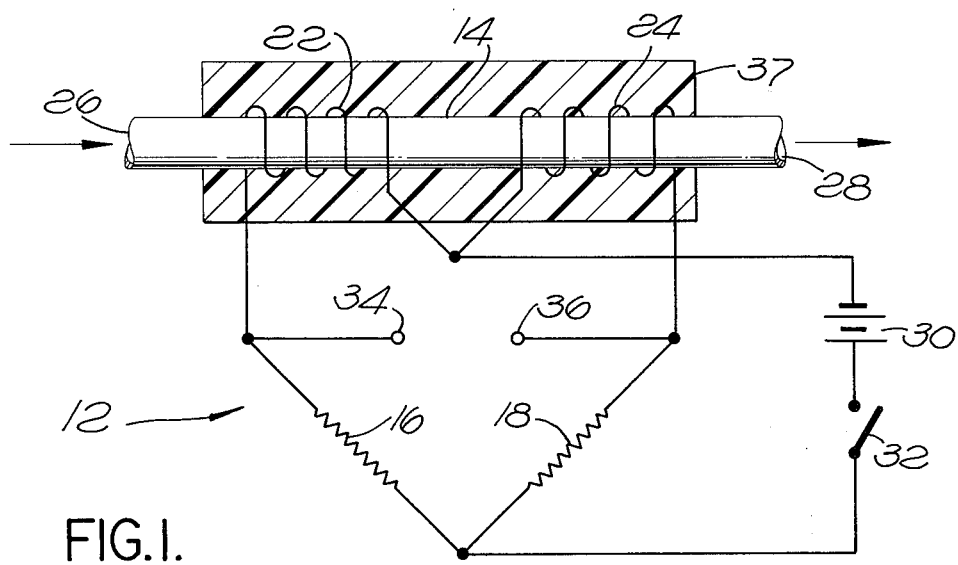
FIG. 1 is a partially schematic circuit diagram of the system of the present invention.

Referring to FIG. 1, there is shown an exemplary embodiment of the mass flow measurement system made in accordance with the principles of the invention. The system comprises a bridge circuit 12 which is coupled to a sensing tube 14. The bridge circuit is of conventional design and is formed of a first bridge resistor 16 and a second bridge resistor 18. The bridge circuit further comprises an upstream sensor element 22 and a downstream sensor element 24. The sensor elements 22 and 24 are wound around the sensing tube adjacent each other, with the upstream sensor element 22 closer to the input end 26 of the tube 14 and the downstream sensor element 24 closer to the output end 28 of the tube 14.

The bridge circuit 12 also comprises a D.C. power supply 30 which is connected at one side between the junction of the sensor elements 22 and 24. The other side of the power supply is connected through a switch 32 to the junction of the bridge resistors 16 and 18. Output signals from the bridge circuit are coupled from a first output terminal 34 and a second output terminal 36. The first output terminal 34 is connected to the junction of the upstream sensor element 22 and the first bridge resistor 16, and the second output terminal 36 is connected to the junction of the downstream sensor element 24 and the second bridge resistor 18. The upstream sensor element 22 and the downstream sensor element 24 are formed of temperature-sensitive resistance wire which is wound around the outer diameter of the tube 14. Such wire can be an iron-nickel alloy, e.g. Balco (a trademark of the Wilbur-Driver Company). Preferably, the tube 14 is a thin walled metal member, e.g. of stainless steel or the like, but other metals can be used to form the tubes.

In accordance with the present invention, insulator material 37, form-fitted to the tube 14, is applied to the tube 14 encasing the sensor elements 22 and 24. The insulator material must have low mass so as to minimize its affect on the response time of the sensor, and must have low thermal conductivity to avoid inordinate reduction in sensor gain due to heat loss through the insulating material. These requirements are uniquely met by a foam material of open cell construction. Suitable materials comprise polystyrene, polyurethane foam, foamed polyethylene, foamed polypropylene and the like. For other materials, reference can be made to the Handbook of Foam Plastics by Rene J. Bender, Lake Publishing Corporation, Libertyville, Ill. (1956), Modern Plastics Encyclopedia, McGraw Hill, Inc. (1968) and the Encyclopedia of Polymer Science and Technology, Interscience Publishers, New York (1970), each being incorporated herein by reference.

Figure 2:
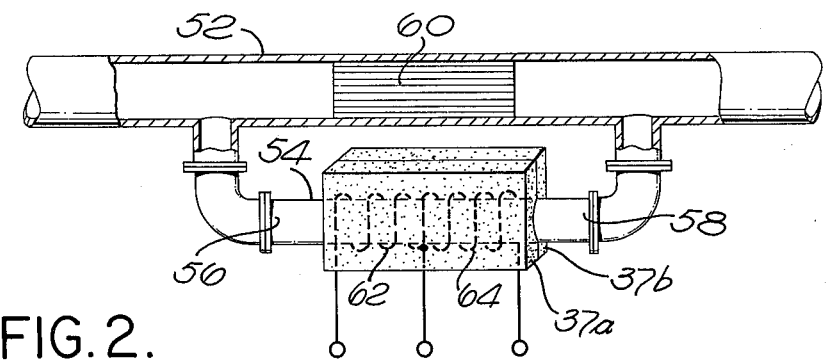
FIG. 2 is a detailed, schematic view of a mass flow sensor which can be used in the present system.

In a particular construction, illustrated in FIG. 2, open cell beaded polystyrene foam, having a density of about 1.0 lb/ft$^3$, is cut into mating blocks 37a and 37b, form fitted on mating surfaces to the sensing tube. The blocks are then glued, taped or clamped to the sensing tube so as to encase the coils.

In operation, when the switch 32 is closed, current flow through the sensor elements 22 and 24, causing the sensor elements to generate heat, thereby raising the temperature of the tube 14 adjacent the elements. Heating of the elements 22 and 24 also raises their resistance. At zero fluid flow through the tube 14, the temperatures of the sensor elements 22 and 24 are equal and the bridge is therefore balanced, producing a zero output voltage across the terminals 34 and 36. As fluid enters the input end 26 of the tube 14, heat generated by the elements 22 and 24 is carried by the fluid downstream toward the output end 28 of the tube 14. Thus, a temperature differential is created between the elements 22 and 24, due to the shifting temperature profile along the tube 14. As the flow of fluid increases in the tube, the temperature of the upstream element 22 as well as its resistance decreases while simultaneously the temperature of the downstream element 24, as well as its resistance, increases. The bridge output voltage at terminals 34 and 36 therefor increases in nearly linear proportion to the flow rate.

Should the flow further increase to a rate several times that of the usable full scale range of the system, the upstream sensor element 22 temperature approaches the inlet fluid temperature, while the downstream sensor element 24 levels off and then begins to fall with the tube temperature as more and heat is carried away by the fluid flow. The bridge output voltage therefor reaches a peak, then reverses and approaches zero asymptotically.

The effect of the foam insulation 37 is demonstrated by tests performed with and without the insulation. In a horizontal position, where the two coils 22 and 24 are at the same level, there is no appreciable difference in bridge output. However, when the sensor is tilted so that one of the coils is vertically positioned over the other, without the insulation, an attitude sensitivity in excess of 50% is observed, whereas with the insulation as described an attitude sensitivity of less than 0.5% is observed. There is some loss in sensor gain and response time, generally no more than 20%, but the general efficiency of the present device permits such reductions without meaningful loss of usefulness and is more than justified by the gain in accuracy obtained in attitude varying situations.

To measure flow rates of a higher range than measurable with the sensor system of FIG. 1, one can use a flow splitting technique as depicted in FIG. 2. The system of FIG. 2 can establish the same flow rate through the sensing system of FIG. 1 at a desired full scale flow. In FIG. 2, a portion of the fluid in a main flow tube 52 is coupled into a secondary sensing tube 54 at an inlet end 56 and is returned to the main flow tube 52 at an outlet end 58. For accurate measurements, the sensing tube 54 should have the same characteristics of pressure drop versus flow rate as that of the main flow tube 52, which can be accomplished by known prior art flow-splitting techniques. By varying the size and effectiveness of a pressure drop device 60 in the main flow tube 52, an almost unlimited number of flow meter ranges can be produced.

In the secondary sensing tube 54, an upstream sensor element 62 and a downstream sensor element 64 corresponds to the upstream and downstream sensor elements 22 and 24 of FIG. 1. The elements 62 and 64 are illustrated as a single coil containing a center tap 66. By utilizing a single coil with a center tap rather than two separate sensor elements, it is possible to space the coils close together. Thus, heat loss is reduced, equalization between the upstream and downstream sensor elements is facilitated, and the gain of the circuit, (temperature change per unit of flow) is greater. In addition, the response of the circuit is faster, and the range of useful flow measurement and the linearity of the circuit is increased. As above indicated, mating blocks 37a and 37b of open cell beaded polystyrene foam are secured over the sensing tube 54 encasing the coils 62 and 64.

The following table provides an illustrative example of various component values for the embodiment of FIG. 2 when connected in the bridge circuit of FIG. 1 as well as typical output response for nitrogen ($N_2$) flowing in the tube 54.

1. Sensing Tube Material = Type 316 Stainless Steel
2. Sensing Tube Length = 3.0 inches
3. Sensing Tube Diameter = 0.014 inches outer diameter
4. Sensing Tube Wall Thickness = 0.002 inches
5. Sensor Element Resistance = 290 ohms each at 32°F (elements 62 and 64)
6. Sensor Element Material = Balco
7. Sensor Element Length = 0.2 inch per element (0.4 inch overall)
8. Foam Insulation Material = 1.0 lb/ft$^3$ beaded polystyrene foam
9. Foam Dimension: 0.80 × 0.50 × 0.12 each block
10. Sensor Element Current = 10.0 milliamps
11. Bridge Output Signal vs. Flow Rate of Nitrogen from 0 to 5.0 SCCM (Standard Cubic Centimeters/minute) = 100 to 100 millivolts
12. Linearity of Output Signal over Flow Range = ±2 millivolts
13. Variation of Output Signal over an ambient temperature range of 50° to 150°F = ±1.0 millivolts at 5.00 SCCM of $N_2$ flow 14. Response time (20 to 100% step change in flow) = 12 seconds to reach 98% of final value Should the ambient temperature change, the sensor element resistance and, thus, the dissipation level also changes. The fluid properties, heat transfer coefficients and relative temperature differences are also altered. Therefore, a particular bridge ratio, which depends upon the temperature coefficient of the sensor element material, must be used to produce a change in output gain with changing sensor resistance that will approximately cancel the effects caused by the change in sensor element temperature and other ambient temperature dependent variables. This ratio will leave the bridge output unaffected by changes in ambient temperature and responsive only to the flow rate of the fluid through the tube. Due to complex difinitive heat transfer equations, and geometrical configuration, the compensating bridge ratio is best determined empirically by actual test over the desired operating temperature range. While other circuits may be used to produce an electrical output for various flow characteristics, the bridge circuit depicted with the particular bridge ratio produces excellent accuracy over wide ambient temperature ranges.

Figure 3:
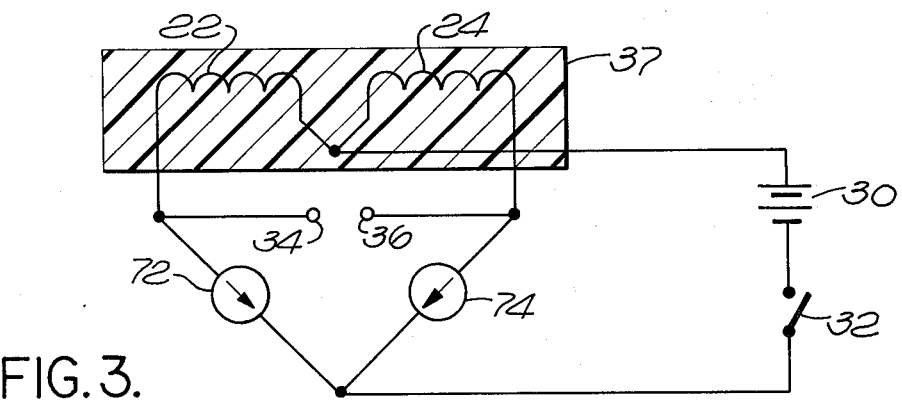
FIG. 3 is an alternative circuit diagram of which is used to temperature-stabilize the devices of FIGS. 1 and 2.

Referring now to FIG. 3, there is shown an alternative arrangement of the flow measurement system of FIG. 1. In FIG. 3, the bridge resistor 16 and 18 of FIG. 1 are replaced by a pair of constant current sources 72 and 74, respectively. Therefore, changes in ambient temperature will have no effect on the temperature stability of the bridge circuit of FIG. 3, as the constant current sources provides an infinite bridge ratio.

Due to the complexity of establishing two separate and equal current sources in the arrangement of FIG. 3, it should be understood that by making the resistors 16 and 18 of sufficiently high value when compared to the resistance of the sensor elements 22 and 24, and inserting a single constant current source in series with the voltage source 30 of FIG. 1, the current through the sensor elements would remain substantially constant. Such an arrangement has the advantage of requiring only one current source. Thus, in practical applications of flow measuring systems where the ambient temperature is rarely held constant and the temperature stability of the system is of utmost importance in achieving good accuracy and repeatability of the measurements, the above-mentioned alternative arrangements wherein a constant current source or sources are provided, will normally overcome the problems associated with ambient temperature changes.

The present system has been described as measuring the flow rate of a fluid. It should be understood that the term fluid is meant to encompass a liquid, a vapor or a gas which is flowing in the sensor tube. It will be appreciated that by insulating the sensor coils, as illustrated, the mass flow meter can be mounted in positions which are not permanent, such as in portable or space vehicle flow measuring equipment. The user is provided more freedom in designing his system since he does not have to mount the flowmeter in one particular position to assure proper calibration of the instrument.

I claim:

1. A mass flow meter for measuring the flow rate of a fluid flowing in the interior of a sensing conduit, comprising:
   a plurality of self-heating sensor element coils comprising two coils having adjacent ends positioned along the flow path of said fluid externally of said sensing conduit one of said sensor elements being closer to one end of said sensing conduit than another of said sensor elements, said sensor element coils being formed of temperaturesensitive resistant wire wound around the outer surface of said sensing conduit and sensing their own temperature modified by said fluid flow;
   means for heating said sensor elements;
   means for detecting the temperature differential of said sensor elements; and
   open cell foam material encasing said sensor elements to provide reduced attitude sensitivity.

2. A mass flow meter in accordance with claim 1 wherein said foam material is polystyrene.

3. A mass flow meter in accordance with claim 1 wherein said sensor elements are formed of a center tapped coil wound around the outer surface of said sensing conduit, the coil material between one end of said coil and said center tap constituting one of said sensor elements and the coil material between the other end of said coil and said center tap constituting the other of said sensing elements.

4. A mass flow meter in accordance with claim 1 wherein said sensor elements have substantially identical heat generating and sensing characteristics.

5. A mass flow meter in accordance with claim 1 and wherein said detecting means includes a bridge circuit to which said sensor elements are coupled, said bridge circuit including a constant current source and providing an output signal of the temperature differential of said sensor elements relatively free from changes in ambient temperature.

* * * * *

UNITED STATES PATENT AND TRADEMARK OFFICE
CERTIFICATE OF CORRECTION

PATENT NO. : 3,938,384
DATED : February 17, 1976
INVENTOR(S) : Richard F. Blair

It is certified that error appears in the above-identified patent and that said Letters Patent are hereby corrected as shown below:

Column 4, line 63, after "=", change "100" to --0--.

Signed and Sealed this eighth Day of June 1976

[SEAL]

Attest:

RUTH C. MASON
Attesting Officer

C. MARSHALL DANN
Commissioner of Patents and Trademarks